US005458902A

United States Patent [19]

Rudel

[11] Patent Number: 5,458,902
[45] Date of Patent: Oct. 17, 1995

[54] HIGH PROTEIN CONTENT BREAD PRODUCT

[75] Inventor: Harry W. Rudel, Elizabeth, N.J.

[73] Assignee: Silvia P. Rudel, Elizabeth, N.J.

[21] Appl. No.: 291,092

[22] Filed: Aug. 16, 1994

Related U.S. Application Data

[63] Continuation-in-part of Ser. No. 781,776, Oct. 23, 1991, abandoned, which is a continuation-in-part of Ser. No. 766,421, Sep. 26, 1991, Pat. No. 5,178,894.

[51] Int. Cl.$^6$ .................................................. A21D 10/00
[52] U.S. Cl. ................................ 426/549; 426/19; 426/62
[58] Field of Search .................................. 426/18, 19, 23, 426/62, 549, 574, 575, 577, 801

[56] References Cited

U.S. PATENT DOCUMENTS

| | | | |
|---|---|---|---|
| 1,964,940 | 7/1930 | Epstein | 99/10 |
| 2,158,392 | 5/1939 | Ament | 99/90 |
| 3,219,455 | 11/1965 | Dubois | 99/90 |
| 3,271,164 | 9/1966 | Andt | 99/90 |
| 3,411,919 | 11/1968 | Glabe | 99/91 |
| 3,561,974 | 2/1971 | Hansen | 99/90 |
| 3,574,634 | 4/1971 | Singer | 99/83 |
| 3,615,674 | 10/1971 | Bass | 99/80 |
| 3,737,423 | 10/1973 | Tsantir . | |
| 3,979,523 | 9/1976 | Titcomb et al. | 426/19 |
| 4,109,018 | 8/1978 | Thompson | 426/62 |
| 4,395,426 | 7/1983 | Fan | 426/62 |
| 4,481,222 | 11/1984 | Fan | 426/62 |
| 4,587,126 | 5/1986 | Patton et al. | 426/19 |
| 4,590,076 | 5/1986 | Titcomb et al. | 426/62 |
| 4,961,937 | 10/1990 | Rudel | 426/19 |
| 5,320,859 | 6/1994 | Namdari | 426/551 |

OTHER PUBLICATIONS

Oomah, *Cereal Chem.*, 60(3), 220–25 (1983).
Dotsenko et al., *Pishchevaya Promyshlennost*, 1, 32–33 (1987).
"Baking Production Technology," American Institute of Baking, Baltimore, Md. (Conference of Nov. 7–9, 1988), pp. 1–5.

*Primary Examiner*—Leslie A. Wong
*Attorney, Agent, or Firm*—Lerner, David, Littenberg, Krumholz & Mentlik

[57] ABSTRACT

A composition for preparing a bread product containing a grain flour having a wheat protein content between about 17% an about 30% by weight, "low heat" non-fat dry milk solids present in an amount between about 9% and about 100% based on flour weight that is effective to provide a bread product having an additive-free specific volume greater than about 4.0 cc/g, and optionally including "high heat" non-fat dry milk solids to augment the protein and calcium levels of the composition, one or more vegetable gums to improve the loaf volume, shape and structural strength of the bread product, or combinations thereof, wherein the combined percentage by weight of milk solids is less than 100% based on flour weight. The preparation of leavened doughs from the composition and baked products from the leavened doughs are also disclosed.

25 Claims, 1 Drawing Sheet

FIG. 1

HIGH PROTEIN CONTENT BREAD PRODUCT

This is a continuation-in-part of U.S. patent application Ser. No. 781,776, filed Oct. 23, 1991, now abandoned, which in turn is a Continuation-In-Part of U.S. patent application Ser. No. 766,421, filed Sep. 26, 1991, which issued as U.S. Pat. No. 5,178,894 on Jan. 12, 1993. The disclosures of both applications are hereby incorporated herein by reference thereto.

BACKGROUND OF THE INVENTION

The present invention relates to bread products having improved keeping qualities containing high levels of non-fat dry milk that substantially increase the quantity and quality of the bread's protein and calcium content. In particular, the present invention relates to bread products having improved keeping qualities, based upon grain flours having a wheat protein content of 17% to 30% and containing "low heat" non-fat dry milk in amounts that provide a composition capable of being formed into a bread product having an additive-free specific volume greater than about 4.0 cc/g.

Gluten is the primary result of the hydration of the proteins gliadin and glutenin by the addition of water to wheat flour, and is responsible for gas retention in yeast leavened baked goods. Gluten also furnishes the cellular network which characterizes the crumb structure of bread and similar yeast leavened baked goods. The volume of these baked goods, that is, the specific volume (cc/g)—or inverse density—, is a measure of lightness and is directly related to the gluten content of doughs made from flours of about 10% to 17% protein content.

For optimal effectiveness, gluten must also be fully developed, a process by which the cross-linked gluten molecules are more linearly aligned making the dough less stiff and elastic and more extensible. As a measure of this extensibility, the ideal dough can be stretched to a translucent membrane of uniform thickness. During the mixing stage of bread making, the wheat proteins in flour are not only hydrated, but the gluten thus formed is developed. In the "no-time" process, a straight dough method with both a shortened mixing time and a substantial reduction of the fermentation stage, gluten development is still accomplished by mechanical means, but with the assistance of reducing agents to break the disulfide bonding on the gluten protein to permit a more rapid realignment by the mixer. The mixing time for full gluten development is reduced to 10 to 15 minutes in the "no-time" method.

Wheat flour used in making white pan bread generally has a protein content between 11% and 13%. Vital gluten, usually as gluten flour with a vital gluten content of 75% or more, may be added to bread flour to increase the protein content. The amount of vital gluten which can be added while still maintaining workable doughs and acceptable breads is about 3–5% of the flour by weight. The addition of vital gluten to wheat flour results in changes in the dough and bread which are directly related to the added amount. These changes consist of the development of increasingly tough, rubbery doughs, difficult to develop into extensible ones and, after processing, breads with increasingly gluten-like characteristics such as an open irregular crumb with gluten strands separating crust and crumb and a rubbery texture of both crust and crumb.

The use of cellulosic filler to reduce the caloric content of bread has permitted the addition of vital gluten in amounts greater than 5%. The vital gluten restores the dough strength lost by flour dilution. This concept has resulted in a series of inventions. Singer, U.S. Pat. No. 3,547,634, describes a low calorie loaf containing less than 15% assimilable carbohydrate with dry ingredients made up of gluten flour (50 parts) and vegetable gum (1–10 parts). The invention specifies a gluten to fiber ratio of 5:1 to 1:1, a ratio far higher than taught in subsequent patents, which disclose that the high gluten content of the baked goods made following the Singer teachings would produce an unacceptably tough and chewy product.

Tsantir and Gorman, U.S. Pat. No. 3,767,423, disclose a composition for use in making a low calorie bread in which the wheat flour is diluted with rice and/or soy hulls up to 20 parts and gluten up to 10.6 parts per 10 parts of flour. The inventors devised an index of user acceptability which is inversely proportional to the wheat gluten content of the product.

Titcomb, U.S. Pat. No. 3,979,523, describes a reduced calorie loaf with 22–25 parts by weight of alpha-cellulose and 10 parts by weight of wheat gluten per 100 parts by weight of wheat flour. Titcomb, U.S. Pat. No. 4,590,076, subsequently disclosed that at least 70% of the alpha-cellulose particles pass a 200 mesh screen. Although the amount of alpha-cellulose dilution of the wheat flour was maintained at the 22–25% level specified in the earlier patent, the amount of wheat gluten was reduced to at least 5% of the flour or sufficient to substantially replace the protein lost in the flour by dilution with alpha-cellulose.

Thompson, U.S. Pat. No. 4,109,018, disclosed the quantitative relationship between alpha-cellulose and vital wheat gluten as well as the limits of these ingredients admixed with wheat flour to be similar to that disclosed by Titcomb. Thompson discloses a dough for making a bread product having 3–9 parts of vital wheat gluten and 10–20 parts of an alpha-cellulose flour per 100 parts of wheat flour. However, the Thompson invention further discloses the addition of 0.5–6.0 parts of a hydrophilic gum and 5–12 parts of an elastic protein material which reportedly increase the moisture content to about 43% in contrast to about 36% for conventional bread.

Patton et al., U.S. Pat. No. 4,587,126, discloses a reduced calorie bread using from 5–20% of citrus vesicle fibers per 100 lb of wheat flour having about 14% protein content. The protein content is achieved by the addition of gluten flour in the amount of 5% and oat flour in the amount of 15% based upon the weight of the flour. Although it was stated that the absence of bucky dough and tough crumb associated with gluten flour is attributed to the citus vesicle fibers, this can also be attributed to the oat flour, particularly because the gluten level of these flours in the Patton reference are at the upper level for flours used in making normal white pan bread.

Oomah, *Cereal Chem.*, 60(3), 220–225, (1983), disclosed that as the concentration of oat flour increased from 5–25% in a composite wheat-oat flour combination, maximum torque decreased in the mixograph. Subsequently, Rudel, U.S. Pat. No. 4,961,937, disclosed that a composition of flours containing gluten flour in amounts sufficient to produce a vital gluten content of at least 17% of the dry mix and a milled oat groat product in amounts sufficient to produce a soluble oat dietary fiber content of flour 0.2% to 56.0% of the vital gluten content of the dry mix could be used to make baked products which are consumer acceptable and capable of being manufactured with existing methods and equipment.

The shortened fermentation time of the "no-time" process of less than one hour produces a bread with a much reduced or eliminated fermentation taste and aroma. The use of non-fat dry milk (NFDM) up to 8.2% but usually 2–3% based upon flour weight, sweeteners or flavors can be used to compensate in flavor but breads made by such short-cut methods still suffer from flavor deficiency. The "no-time" process products also suffer from a poorer shelf life which can be improved by the use of crumb softeners but still are not well accepted when shelf lives of one to three days are required.

These problems are not limited to the "no-time" process. The continuous mix process also suffers from the same limitations because of the lack of flavor development. Although continuous-mix bread has a fine grain and silky texture, it is very low on flavor because the flour and other ingredients have a reduced exposure time to yeast and the products of fermentation. However, the process is intolerant of NFDM, and the use of this flavor adjunct is therefore limited.

The traditional method of making bread, the sponge and dough process, has fermentation periods of four to over five hours. During this time there are products formed which impart a large part of the flavor to bread. NFDM added in amounts of 4–6% of the flour weight enhances the flavors of these natural fermentation products.

Conventionally, NFDM is heat-treated to denature certain of the milk proteins, particularly the whey proteins, lactalbumen and globulins. This "high heat" NFDM is considered essential for use in leavened baked goods because the undenatured proteins of "low heat" dried non-fat milk react unfavorably with gluten causing poor structure with reduced gas retention and, consequently, loaves of unacceptable volume.

Even "high heat" NFDM has limitations. Levels of "high heat" NFDM over 5% in the sponge and dough process have adverse effects on loaf volume. These negative effects are more pronounced in the "no-time" and continuous-mix processes; in the former, "high heat" NFDM use is recommended at the 2% level and in the latter, above the 1% level loaf structure is compromised. It should be noted that levels of "high heat" NFDM below 3%, based on flour weight have little effect on bread flavor. Efforts have been made to increase the level of "high heat" NFDM addition in the continuous-mix process.

Andt, U.S. Pat. No. 3,271,164, discloses a continuous process of bread making in which there is added to the dough about 4% of NFDM (high heat) and an additive consisting essentially of from about 0.1% to 0.9% karaya gum and from about 0.02% to about 0.1% of materials selected from algins and carrageenans, all percentages being by weight of the flour. Glabe and Jertson, U.S. Pat. No. 3,411,919, describe a continuous-mix bread containing NFDM (high heat) in amounts from 2–6% of the flour weight, through the incorporation of hydroxylated phosphatide, 0.1% to 1.0% and carrageenan extract of 0.01% to 0.15% of the flour weight.

Fan, U.S. Pat. No. 4,395,426, discloses a dry mix for preparing bread without a kneading step, which contains in addition to other ingredients about 0.5 to 1.5 parts by weight per 100 parts of flour of a glycol alginate and about 2 parts to 10 parts by weight per 100 parts flour of a vegetable gum selected from karaya gum, guar gum, xanthan gum, high viscosity carrageenan gum and mixtures thereof and additionally 1 part to 10 parts of "high heat" non-fat dry milk solids (NFDM).

Dotsenko et als., *Pishchevaya Primyshlennost*, 1, 32–33 (1987) using NFDM in amounts from 10–15% based on the wheat flour weight, together with monoglyceride esters of diacetyl tataric acid and the multi-enzyme complex MFK-KhP to hydrolyze the NFDM, showed improved rheological properties and binding capacities for the resulting doughs. There were no descriptions of bread products made from these doughs.

Rudel, U.S. Pat. No. 5,178,894 discloses a composition for preparing a bread product containing a wheat flour having a protein content between 10% and 17% by weight and about 24% to 48% based upon the flour weight of "high heat" NFDM and optionally one or more vegetable gums which reverses the negative effect of "high heat" NFDM on loaf volume when employed in amounts greater than 5% based upon the flour weight.

Whey, the water soluble fraction remaining after cheese processing is used in a dried form alone or more frequently in combination with soy flour as a replacement for "high heat" NFDM at levels of about 1% to 4% based upon flour weight. This soy flour/whey blend is being generally adopted by bakers for bread processing due to its lower cost compared to "high heat" NFDM. The whey product used in the blend contains 11% protein (lactalbumen and lactglobulin) and 74% lactose. In the case of the soy flour/whey blend, the soy flour provides additional protein to mimic the levels provided by "high heat" NFDM and also dilutes the lactose to the level of NFDM. This makes it easier to substitute the soy flour/whey blend for NFDM on a weight-for-weight basis. Whey used alone changes the absorption characteristics of the flour even at the levels of 4% based upon flour weight.

Whey protein concentrates have been used to upgrade the nutritional value of bread-like baked goods. Hansen, U.S. Pat. No. 3,561,974, describes the use of a whey concentrate (84% protein on a weight basis) to make a protein enriched bread product. Even though a wheat flour of high gluten content (about 20%) is used, the large dilution of the flour with the whey concentrate (about 67% based on flour weight) produces a weakened dough which is more difficult to machine, is intolerant of "floor time", evidences little or no "oven spring" and requires a longer baking time and hotter ovens than generally employed in bread manufacture because of the higher water content of the dough.

Before the process of staling was understood as it is today, the dryness associated with staled crumb of baked goods led to the use of hydrocolloidal vegetable gums as humectants or moisturizers. These agents take up and hold water in amounts many times their own weight. As an example, the uptake of water by alginates is 26 cc/g in contrast to 1 cc/g for gluten and 0.4 cc/g for undamaged starch. It should be emphasized that these agents are not to be considered anti-stalants, even though the above-cited Andt, U.S. Pat. No. 3,271,164, defines the mixture of karaya and algins and/or carrageenans described as "an additive to retard staling" because loaves treated with 0.5% of the additive showed a greater softness initially and after 96 hours when compared to control loaves. However, the rate of firming used as the index of staling was similar in both groups.

Others claiming improvements in keeping qualities from hydrocolloidal vegetable gums because of moisture retention and softness include: Curtner, U.S. Pat. No. 1,534,783, Epstein, U.S. Pat. No. 1,964,940, and Ament, U.S. Pat. No. 2,158,392. Fiske, U.S. Pat. No. 1,657,116, describes a composition of gum tragacanth, 3.0%, and iodic acid, 0.0175%, based upon 100 lb of bread flour mixture as a bread volume enhancer. Similarly, Dubois, U.S. Pat. No. 3,219,455, describes a bread additive comprising about 20–30 parts vital gluten, 3–5 parts hydrophilic colloid (carboxymethylcellulose) and 0.01 to 0.025 parts of an oxidizing agent (potassium bromate) based upon 1,000 parts of bread flour, which has the property of increasing bread volume and compressibility of breads made from said flours.

There are no reports on "low heat" NFDM (NFDM which has not been heat treated to denature whey protein) showing beneficial effects either from its use in the process of bread making or on the baked products resulting from such processes.

SUMMARY OF THE INVENTION

During the course of investigating means of improving the crumb of high gluten content baked goods, surprising benefits were discovered from the effects of "low heat" NFDM on baked goods of varying gluten contents and on the processes used to produce such baked goods.

It has been found that "low heat" NFDM in amounts of from 9% to 100%, based upon the flour weight, when combined with flours having a wheat protein content of from 17% to 30% reduces the times for mixing, make-up and proofing of yeast leavened doughs made from such flours. The resulting baked goods have improved specific volumes, appearance, aroma, flavor and nutritional value compared to the same products made without the addition of "low heat" NFDM. The addition of vegetable hydrocolloids such as guar gum to these combination of "low heat" NFDM and flours further improves the specific volumes and increases the keeping times of the resulting baked goods.

One object of the present invention is to obtain compositions of flours which can be used to make yeast leavened baked goods of greater specific volumes with improved texture and flavor.

It is another object of this invention to obtain compositions of flours, utilizing wheat or other grain flours augmented by the addition of vital gluten, producing flours of wheat protein (including gluten) of greater than 17%, which can be used to make yeast leavened baked goods of improved nutritional value from an increased quantity and quality of protein and calcium content of the baked goods.

It is a further object of this invention to obtain flours which can be used to reduce the mixing time in making bread doughs of varying gluten contents with increased extensibility thereby shortening the mixing time and relaxation time of such doughs so that they may be more easily worked into various dough forms.

Therefore, according to one embodiment of the present invention, a composition for preparing a bread product is provided containing a grain flour having a wheat protein content between about 17% and about 30% by weight and "low heat" non-fat dry milk solids, in an amount between about 9% and about 100% based on flour weight that is effective to provide a composition capable of being formed into a bread product having an additive-free specific volume greater than about 4.0 cc/g. This embodiment of the present invention also includes doughs made by the addition of water and a leavening agent to the composition, and baked products made from the leavened dough.

The present invention further includes the discovery that the above combination of grain flour having a wheat protein content between about 17% and about 30% by weight and "low heat" non-fat dry milk solids can be supplemented by "high heat" non-fat dry milk solids to increase the protein and calcium content of the bread product, yet provide a bread product still having an additive-free specific volume greater than about 4.0 cc/g, provided that the combined percentage by weight of milk solids does not exceed 100% based on flour weight. Therefore, according to another aspect of the above embodiment of the present invention, the combination of grain flour having a wheat protein content between about 17% and about 30% by weight and "low heat" non-fat dry milk solids between about 9% and about 100% based on flour weight, which combination provides a composition capable of being formed into a bread product having an additive-free specific volume greater than about 4.0 cc/g, may further include "high heat" non-fat dry milk solids, wherein the combined percentage by weight of milk solids is no more than 100% based on flour weight.

The compositions of the present invention can be used to make baked goods such as bread products using standard bakery equipment. The compositions of the present invention form a soft, elastic dough requiring about half of the time for mixing and make-up as standard, conventional doughs. The bread products of the present invention not only have superior nutritional properties, excellent appearance, flavor and eating qualities, but also demonstrate a retardation of staling and increased keeping time.

DETAILED DESCRIPTION OF THE PREFERRED EMBODIMENT

The compositions of the present invention for preparing bread products are based on grain flours having a wheat protein content between about 17% and about 30% by weight. Examples of grain flours suitable for use with the present invention include wheat flour, whole wheat flour, wheat bran, rye flour, Miller's bran flour, corn flour, milled oat bran, milled rolled oats, millet flour, rice flour, oat flour, barley flour, triticale flour, soy flour, buckwheat flour and the like, and mixtures thereof. The preferred flour is wheat flour. Wheat flours having wheat protein contents between about 10% and about 14% by weight are commercially available and can be readily obtained by the ordinarily skilled artisan.

Wheat protein levels between about 17% and about 30% by weight can be provided to grain flours other than wheat, and wheat protein levels above about 17% by weight can be provided to wheat flour, by the addition of vital gluten to the flour. Vital gluten is a conventional flour additive and is understood by the ordinarily skilled artisan to be a form of gluten proteins extracted from wheat flour that retain the ability to cross link and otherwise behave as native gluten when added to a grain flour to augment the protein level. Grain flours having a wheat protein content up to about 28% are preferred.

The compositions of the present invention combine the grain flour with "low heat" non-fat dry milk solids (NFDM). While "low heat" non-fat dry milk solids are not ordinarily employed in leavened baked goods, this material is commercially available and well-known in the art. Generally, "low heat" non-fat dry milk has not been subjected to the higher temperatures, compared to normal pasteurization temperature, that "high heat" non-fat dry milk is subjected to during drying, that partially denature the milk proteins.

The quantity of "low heat" non-fat dry milk employed in the compositions of the present invention should be that quantity between about 9% and about 100% based on the flour weight effective to provide a composition capable of being formed into a bread product having an additive-free specific volume greater than about 4.0 cc/g. Additive-free specific volumes greater than about 5.0 cc/g are preferred. Specific volume is a measure of loaf volume, which is an inverse density measurement, measured in units of volume per given weight. "Additive-free specific volume" is defined as the specific volume obtained by the bread products of the present invention attributable to the combination of milk solids and grain flour, and without the assistance of additives to increase loaf volume such as oxidizing agents or humectants such as vegetable gums.

The additive-free specific volume is determined by preparing bread loaves using standard bakery equipment and practices. 2.5 parts by weight each of sugar, shortening and compressed yeast, 1.25 parts by weight of salt and sufficient water to make dough are combined with 100 parts of flour and the quantity of milk solids to be tested. The ingredients are mixed in a planetary mixer with a dough hook. The dough formed is then scaled at 63 g pieces, panned, proofed approximately one hour and baked at 204° C. for 12 minutes. The loaves are then cooled and measured to determine specific volume.

It has been found that for grain flours having a wheat protein content of about 17% by weight, the maximum additive-free specific volume is obtained at a "low heat" NFDM level of about 9% based on flour weight. Additive-free specific volumes greater than about 4.0 cc/g are obtained with levels of "low heat" NFDM up to about 20% based on flour weight. For grain flours having a wheat protein content of about 21% by weight, the maximum additive-free specific volume is obtained at a "low heat" NFDM level of about 20% based on flour weight. Additive-free specific volumes greater than about 4.0 cc/g are obtained with levels of "low heat" NFDM up to about 40% based on flour weight.

For grain flours having a wheat protein content of about 24%, the maximum additive-free specific volume is obtained with a "low heat" NFDM level of about 40% based on flour weight. For grain flours having a wheat protein content of about 26%, the maximum additive-free specific volume is obtained with a "low heat" NFDM level of about 62% based on flour weight. For grain flours having a wheat protein content of about 28%, the maximum additive-free specific volume is obtained at a "low heat" NFDM level of about 88% based on flour weight.

Figure 1:
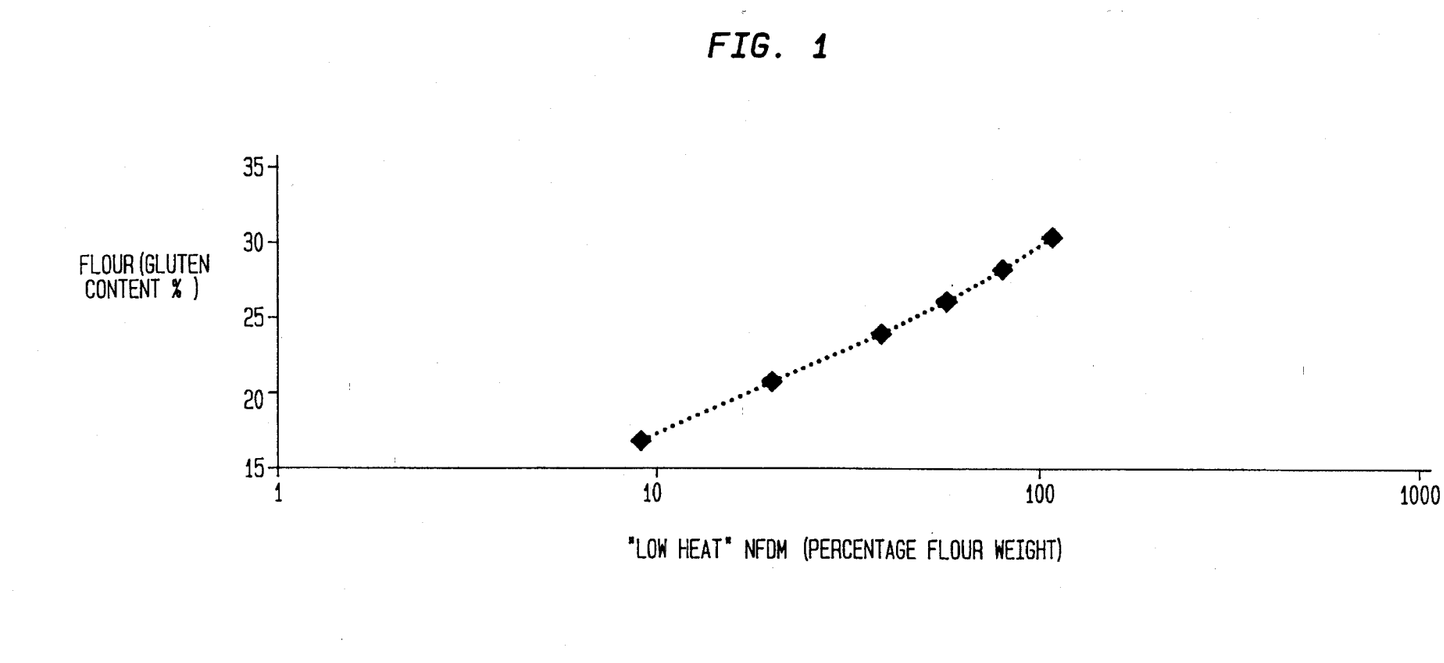
FIG. 1 depicts the logarithmic relationship between the protein level of wheat flours and the quantity of "low heat" non-fat dry milk solids that produces maximum loaf specific volume.

At wheat protein levels of 30% and greater, the quantity of "low heat" NFDM optimally required to balance the effects of the gluten content of these flours on the resultant baked products would be 120% flour weight or greater as determined from the extrapolation of the experimentally determined curve in FIG. 1. However, at levels of NFDM greater than 100% flour weight, the dilution of the grain flour components are such as to provide insufficient structural material for a full volume baked piece having a specific volume of 4.0 cc/g or greater. Amounts of "low heat" NFDM less than these "optimal values" allow for the appearance to varying degrees of the characteristics associated with gluten, such as tough, rubbery doughs, difficult to work and baked products having a large, open and irregular crumb, crust-crumb separation and a rubbery, chewy texture.

As noted above, the compositions of the present invention may optionally include "high heat" non-fat dry milk solids as a protein and calcium nutritional supplement. The quantity of "high heat" NFDM that can be added to the compositions of the present invention, is that quantity in combination with the "low heat" NFDM that provides a composition capable of being formed into a bread product having an additive-free specific volume greater than about 4.0 cc/g. In addition, the combined percentage by weight of "high heat" and "low heat" milk solids should not exceed 100% based on flour weight.

While not being bound by any particular theory, it is believed that undenatured whey-related proteins in the "low heat" NFDM are contributing to the increase in specific volume in bread products prepared from doughs containing "low heat" NFDM. Trace quantities of these proteins are believed to be present in the "high heat" NFDM. For this reason, additional levels of "high heat" NFDM can be used in the compositions of the present invention without significantly affecting the specific volume of bread products prepared therefrom. However, because small quantities of the undenatured proteins affecting specific volume are present in the "high heat" NFDM, the quantity of "low heat" NFDM utilized should be a quantity slightly lower than the amount that would provide the maximum additive-free specific volume in the absence of "high heat" NFDM.

For the compositions of the present invention, "high heat" NFDM can be added at levels up to about 50% based on flour weight for grain flours having wheat protein levels of about 17% by weight without lowering the additive-free specific volume of bread products prepared therefrom below 4.0 cc/g, although, to maximize the quantity of "high heat" NFDM that can be added, the level of "low heat" NFDM should be between about 3% and about 5% based on flour weight. Therefore, the present invention also includes a composition containing a grain flour having a wheat protein content of about 17%, "low heat" NFDM solids between about 3% and about 5% based on flour weight, and "high heat" NFDM at levels up to about 50% based on flour weight.

For grain flours having wheat protein levels of about 21% by weight, "high heat" NFDM can be added to the compositions of the present invention prepared therefrom at levels up to about 60% based on flour weight without lowering the additive-free specific volume of bread products prepared therefrom below 4.0 cc/g, although, to maximize the quantity of "high heat" NFDM that can be added, the level of "low heat" NFDM should be less than about 20% based on flour weight. For grain flours having wheat protein levels of about 24% by weight, "high heat" NFDM can be added to the compositions of the present invention prepared therefrom at levels up to about 65% based on flour weight without lowering the additive-free specific volume of bread products prepared therefrom below 4.0 cc/g. However, the combined percentage of "high heat" and "low heat" milk solids should not exceed 100% based on flour weight. And, to maximize the quantity of "high heat" NFDM that can be added, the level of "low heat" NFDM should be less than about 40% based on flour weight.

Preferred compositions according to this aspect of the present invention contain that quantity of "high heat" NFDM sufficient to provide a bread product in which about a 50 to 100 g serving contains a protein and calcium level equivalent to about 120 to about 240 mL of whole milk. Thus, preferred compositions of the present invention contain grain flours having a wheat protein content between about 17% and about 26% by weight, "low heat" NFDM in an amount between about 3% and about 50% based on flour weight, and "high heat" NFDM in an amount between about 20% and about 65% based on flour weight. More preferred compositions in accordance with the present invention contain grain flours having a wheat protein content between about 17% and about 21% by weight, "low heat" NFDM in an amount between about 3% and about 15% based on flour weight, and "high heat" NFDM in an amount between about 30% and about 50% based on flour weight.

The compositions of the present invention may optionally include one or more vegetable gums, which, as disclosed in the above-cited U.S. Pat. No. 5,178,894, function to improve the loaf volume, the disclosure of which in this regard is hereby incorporated herein by reference thereto. Vegetable gums have been used in the past as humectants or moisturizers in baked goods such as bread products. Such gums are well-known in the food art and the skilled artisan will have no problem selecting suitable gum grades from those commercially available.

Examples of vegetable gums suitable for use in the present invention include guar gum, carrageenan, algins, karaya gum, and the like. The preferred vegetable gums are guar gum and carrageenan. The most preferred vegetable gum is guar gum. By the addition of one or more vegetable gums as a specific volume-improving additive to the compositions of the present invention, bread products can be prepared having specific volumes up to 5.0 cc/g and higher. The compositions of the present invention may include one or more vegetable gums in amounts between about 0.12% and about 1.70% by weight per 100 parts of flour. Preferably, the compositions of the present invention contain between about 0.50% and about 1.50% by weight per 100 parts of flour of one or more vegetable gums, and more preferably contain between about 0.90% and about 1.10% by weight per 100 parts of flour of one or more vegetable gums.

The compositions of the present invention can also optionally include those materials conventionally used in bread manufacturing, such as crumb softeners, reducing and oxidizing agents, mineral yeast foods, and the like, with normally expected results. Oxidizing agents are well-known as conventional additives for the improvement of loaf volume. Examples of commercially employed oxidizing agents include potassium bromate, ascorbic acid, azodicarbamide (ADA), and the like. The following levels of oxidizing agents are used commercially: potassium bromate, 40–75 ppm; ADA, 20–45 ppm; and ascorbic acid, 50–200 ppm. Two or more oxidizing agents may be used in combination, in which instance levels are employed at the lower end of the above-listed ranges.

The compositions of the present invention can then be formed into a bread product dough by combining the composition with a leavening agent and water. The dough may optionally include a nutritive carbohydrate sweetening agent such as sugar, as well as salt, shortening and the like.

The amount of water used should be that quantity sufficient to make the dough. The selection of the appropriate quantity of water is a conventional procedure that poses no problem to the ordinarily skilled artisan.

Leavening agents are also well-known and include yeast, as well as chemical leavening agents such as sodium bicarbonate, baking powder (calcium acid phosphate and sodium aluminum sulfate), tartaric acid, and its potassium acid salt. The preferred leavening agent is yeast. When a chemical leavening agent is used, it should be present in an amount between about 0.75% and about 7.5% by weight per 100 parts of flour, and preferably in an amount between about 1.0% and about 3.0% by weight.

The yeast may be either active dry yeast or compressed yeast. The choice depends upon the bakery and its method of operation. Compressed yeast is used in the present invention, but the selection of appropriate yeasts pose no problem for the ordinarily skilled artisan. Compressed yeast should be added to the dough in a quantity between about 0.5% and about 5.0 by weight per 100 parts of flour, and preferably in a quantity between about 3.0% and about 4.0% by weight.

With respect to the optional dough ingredients, the nutritive carbohydrate sweetening agent includes those typical sweetening agents conventionally used in food products. Suitable sweetening agents are well-known in the art and examples of which include both monosaccharide and disaccharide sugars such as sucrose, invert sugar, dextrose, malt syrup, honey, maltose, molasses, fructose, corn syrup solids, and high fructose corn syrup. Preferred sweetening agents include sucrose, dextrose, corn syrup solids and high fructose corn syrup. The sweetening agent is present in an amount between about 0% and about 12% by weight per 100 parts of flour, and preferably in an amount between about 3% and about 6% by weight.

Salt is also conventionally employed in the preparation of bread products. The salt should be present in an amount between about 0% and about 2.5% by weight per 100 parts of flour, and preferably in an amount between about 1.5% and about 2.25% by weight.

Conventional shortening materials are suitable for use as the optional shortening ingredient of the dough mixtures prepared from the composition of the present invention. Such conventional shortening materials are well-known to the ordinarily skilled artisan. Included within the definition of shortenings are materials such as margarines. Either liquid or solid shortenings of animal, vegetable, marine or synthetic oil origin can be used. The preferred shortening material is derived from soybean oil. The shortening should be present in an amount between about 0% and about 5% by weight per 100 parts of flour, and preferably in an amount between about 2% and about 3%.

Baked goods can be produced from the dry mixes of the present invention using standard bakery equipment and practices. For example, to produce dinner rolls, the grain flour and the NFDM can be combined and dry blended and then placed into a horizontal mixer and combined with the sugar, salt, shortening, compressed yeast and sufficient water to make a dough. The ingredients are mixed at low speed for 2 minutes and at high speed (80 RPM) for 5–7 minutes, about half the time of standard doughs. A soft, elastic dough forms in the mixer, which is then transferred to an automatic dough divider and rounder. The panned dough pieces are then proofed for approximately 35 minutes, again, about half the time regularly required for standard doughs. The dough pieces are then baked at 204° C. for 12 minutes, with an optional initial steam application. The baked pieces are then cooled, bagged and tied. When a vegetable gum is used, it is blended with the grain flour and NFDM before the flour and NFDM are added to the horizontal mixer and combined with the other ingredients.

It will thus be appreciated that, in accordance with the present invention, bread products may be prepared from "low heat" NFDM, thereby substantially increasing the quantity and quality of the protein and calcium content of the bread. "High heat" NFDM may also be included to further increase the protein and calcium levels. The addition of "low heat" and "high heat" NFDM results in the formation of a soft, elastic dough, requiring about half of the time for mixing and proofing as standard, conventional doughs.

Specific embodiments of the present invention are illustrated by the following examples, which are not intended to limit the scope of the invention as defined by the appended claims.

The protein percentages of the grain flours are weight percentages. Unless otherwise indicated, the other percentages are based upon the flour weight, the standard method employed by bakers. Loaf volume is measured by specific volume, which is an inverse density measurement, measured in units of volume per given weight. In the following examples, specific volume is measured in cubic centimeters per gram.

NFDM was added to the dough to promote specific volume. An optimum "low heat" NFDM addition was determined for each wheat protein level; using the maximally obtained specific volume in the series as the index. The results for flours with wheat protein contents of 17% to 30% are presented in Table I. Note that control values were not considered for flours having a gluten content above 17% because of the difficulty working such doughs and the irregularity of their crumb and crust structure (also see Table III).

TABLE I

THE SPECIFIC VOLUME OF BAKED LOAVES AS A RELATIONSHIP BETWEEN "LOW HEAT" NFDM (% FLOUR WEIGHT) AND THE GLUTEN CONTENT (%) OF THE FLOUR

| "LOW HEAT" NFDM % FLOUR WEIGHT | GLUTEN CONTENT (%) OF FLOUR ALL VALUES ARE SPECIFIC VOLUMES (STD DEV) | | | | | |
|---|---|---|---|---|---|---|
| | 17 | 21 | 24 | 26 | 28 | 30 |
| 0 (Control) | *5.0 (.24) | | | | | |
| 4. | *4.9 (.32) | | | | | |
| 9. | 5.4 (.13) | | | | | |
| 12. | 5.2 (.50) | | | | | |
| 14. | | *4.7 (.32) | | | | |
| 18. | *4.3 (.21) | | | | | |
| 20. | | 5.3 (.24) | | | | |
| 25. | | | *4.2 (.17) | | | |
| 30. | | 5.2 (.17) | | | | |
| 33. | | | *5.2 (.21) | | | |
| 40. | | | 5.6 (.23) | | | |
| 50. | | | *4.6 (.18) | 4.8 (.53) | | |
| 62. | | | *4.2 (.21) | 5.1 (.35) | | |
| 87.5 | | | | | 5.2 (.48) | |
| 100. | | | | | *4.5 (.08) | 4.7 (.12) |
| 120. | | | | | | +3.4 (.01) | i Underlined SP. Vol. Represents Optimal Value - See Text
ii *Specific Volume < Optimal Value p < .01
iii +Theoretical Optimum Value (By Extrapolation) < Specific Volume Of 100% Addition p < .01

EXAMPLES

EXAMPLE I

SPECIFIC VOLUME OF BREAD LOAVES AS A FUNCTION OF "LOW HEAT" NFDM ADDITION TO WHEAT FLOUR OF VARIOUS PROTEIN CONTENT

Using a straight-dough method, loaves were prepared by the addition of 2 g salt, 9 g sugar, 9–15 g yeast and water to various flour mixes composed of 250 g wheat flour with a wheat protein content of 17% to 30% and non-fat dry milk that was not heat treated to denature the whey proteins ("low heat" NFDM). The amount of "low heat" "NFDM" blended with the flour varied in amounts of from 4% to 120% (10 g to 300 g), based on the wheat flour weight.

As shown in Table I, there was a series of "low heat" NFDM additions studied for each wheat protein level. Gluten flour, having a vital gluten content of more than 75% was used to augment the wheat protein content of the wheat flour having a protein content of 12.5%. The doughs were scaled at 63 g, proofed for 30 minutes to one hour, and then baked at 204° C. The resulting loaves were cooled and their specific volumes were determined using a displacement technique. The specific volumes obtained are "additive-free" specific volumes, because nothing other than "low heat"

The amounts of these optimal values of "low heat" NFDM additions increase directly with increasing levels of wheat protein of the flour. The optimum values of "low heat" NFDM addition determined for increasing levels of wheat protein contents from 17% up to 30% are shown in Table II. The data points of Table II are also plotted on the graph of FIG. 1. As shown in FIG. 1, as the percentage of wheat protein in the flour increases geometrically, the optimal amount of "low heat" NFDM addition (based on the flour weight) increases logarithmically. The relationship satisfies the equation $y = a(\log x) + c$, where y is the protein content of the flour expressed as percentage and x is the "low heat" NFDM addition expressed as percentage based on the flour weight.

TABLE II

OPTIMAL VALUES OF "LOW HEAT" NFDM (% FLOUR WEIGHT) AS A FUNCTION OF THE GLUTEN CONTENT (%) OF FLOUR

| "LOW HEAT" NFDM (% FLOUR WEIGHT) | FLOUR GLUTEN CONTENT (%) |
|---|---|
| 9.0 | 17 |
| 20.0 | 21 |
| 40.0 | 24 |
| 62.0 | 26 |

TABLE II-continued

OPTIMAL VALUES OF "LOW HEAT" NFDM (% FLOUR WEIGHT) AS A FUNCTION OF THE GLUTEN CONTENT (%) OF FLOUR

| "LOW HEAT" NFDM (% FLOUR WEIGHT) | FLOUR GLUTEN CONTENT (%) |
|---|---|
| 87.5 | 28 |
| 100.0 (120)* | 30 |

*Values > 100% Flour Weight Create Dilution Effects In The Grain Flour Which Diminish The Enhancing Effect On Specific Volume Produced By "Low Heat" NFDM.
120 Is Theoretical Value As Determined By Extrapolation (FIG. 1).

Bread products made with "low heat" NFDM addition not only have better specific volumes than control loaves, but they also have a better flavor and aroma reminiscent of home style bread made using the sponge and dough process. These changes combined with a crumb texture which is softer and silkier than control breads give these breads a higher acceptability.

EXAMPLE II

EFFECT OF "LOW HEAT" NFDM ON HIGH PROTEIN CONTENT WHEAT FLOURS

The above-discussed improvement in bread texture as well as dough handling is particularly apparent in products made for flours with protein contents of 20% and above because without the "low heat" NFDM addition, both the doughs and finished baked goods made from such flours suffer the problems associated with excessive amounts of gluten. This is demonstrated by the following experiments:

Flour having a wheat protein content of 24–25% was prepared by the addition of gluten flour (approximately 80% vital gluten) to wheat flours of 10–13% protein content. Loaves were made using the straight dough method of Example I by the addition of salt, sugar, yeast and water to 250 g of these flours after various amounts of "low heat" NFDM from 25% to 62.5% (62.5 g to 156.3 g) based on the flour weight, were combined with them, as shown in Table III. The doughs, scaled at 63 g, were proofed for up to 1 hour, baked at 204° C. for 12 minutes and the resulting loaves were measured to determine specific volume using a displacement technique. The results are summarized in Table III.

The control dough without "low heat" NFDM is tough, bucky and elastic but not extensible. The addition of "low heat" NFDM has a softening effect on the gluten and with increasing amounts, the dough becomes extensible, and able to be stretched to a thin, translucent membrane. As shown in Table III, the breads resulting from these doughs also undergo progressive improvements until a maximum, based upon specific volume, crumb appearance and texture of crust and crumb, is obtained. The control loaves have a crumb with a large irregularly open grain and a chewy gluten-like texture. The crust and crumb have small areas of separation which falsely enhance the specific volume of 5.9 cc/g.

The addition of "low heat" NFDM produces a bread having a crumb with a regular, open to fine grain which is shredable and a soft texture. The maximally obtained specific volume of 5.6 cc/g actually surpasses the control value by taking into account the crust/crumb separation seen in the control loaves without considering the factor of the flour dilution by NFDM addition.

TABLE III

| "LOW HEAT" NFDM % FLOUR WEIGHT | (STD. DEV.) SPECIFIC VOLUME | DESCRIPTION DOUGH | DESCRIPTION BREAD |
|---|---|---|---|
| 0 | 5.9 (.33) | Tough, Elastic | Open, irregular grain; gluten-like texture |
| 25 | 4.2 (.17) | Strong, Elastic | Fine, regular grain; soft, shredable texture |
| 33 | 5.2 (.21) | Soft Extensible | Fine, regular grain; soft, shredable texture |
| 40 | 5.6 (.23) | Soft, Extensible | Fine, regular grain; soft, shredable texture |
| 50 | 4.6 (.18) | Soft, Extensible | Fine, regular grain; soft, shredable texture |
| 62.5 | 4.2 (.21) | Strong, Plastic | Fine, regular grain; soft, shredable texture |

*See TABLE I

EXAMPLE III

EFFECT OF "LOW HEAT" NFDM ON HIGH PROTEIN CONTENT WHEAT FLOUR AT THE PRODUCTION LEVEL

Results similar to those reported in the laboratory study (Example II) were obtained in a bakery operation using commercial scale equipment. The production run was made employing a "straight dough" method. A 24% gluten content wheat flour was made by mixing wheat flour (12.5% gluten) and vital gluten (80% gluten) "low heat" NFDM was used at a level of 39% based upon flour weight (wheat flour plus vital gluten).

The following dry ingredients were added to a "Peerless" horizontal mixer (180 kg. capacity) and blended:

| Wheat Flour (12.5% Gluten) | 31.4 kg |
|---|---|
| Vital Gluten (80.0% Gluten) | 6.6 kg |
| "Low Heat" NFDM | 15.0 kg |
| Guar Gum | 0.4 kg |
| Sugar | 1.4 kg |
| Salt | 0.7 kg |

After blending, the following ingredients were added:

| Shortening | 1.4 kg |
|---|---|
| Yeast | 2.3 kg |
| Water | 26.0 kg - a sufficient quantity to make a dough |

All ingredients were mixed at low speed (40 rpm, 10 hp) for two minutes and at high speed (80 rpm, 20 hp) for five minutes. A soft, elastic dough mass was formed which was easily removed from the mixer, leaving it clean. The resultant dough was fed into an automatic divider and rounded to produce dinner rolls (63 g to 65 g scale). The dough ran clean without hang-up. The pieces were panned and proofed for one hour at 37° C. and 98% humidity. There was an excellent rise with the pieces coalescing, filling the pans. The volumes held for a "floor time" of more than one-half hour, awaiting oven space. The rolls were baked at 190° C. for 13 minutes, a normal baking time, but a reduced temperature to prevent excessive browning because of the high lactose content. There was a good "oven spring" and the rolls exited the oven having an excellent full appearance with a golden brown color and a rich aroma. The rolls were cooled in an open room, depanned, divided into 6×6 pieces and packaged one dozen to a package in a polyethylene tie bag.

The rolls were distributed blindly to the bakery staff not involved with this production and comments were sought. The rolls were universally well received by the above-described acceptors and requests were made to supply their family tables.

Packaged rolls were stored at 4° C. for 30 days. They were sampled at three- to four-day intervals. The samples remained fresh and free of staling during this period. Staling and acceptability was evaluated using a specially devised physical and organoleptic scale previously reported U.S. Pat. No. 4,961,937.

Samples of this batch kept at room temperature, the preferred temperature to retard staling developed mold at 5–7 days since the product was cooled in an open air space without controlled air flow and no anti-mold agents were included in the formulation.

EXAMPLE IV

EFFECT OF VEGETABLE GUMS ON BREADS CONTAINING "LOW HEAT" NFDM

People eating high gluten breads, particularly bread more than one day old, may experience a sensation of dryness and granularity. This same sensation is experienced with those high-gluten breads made from flours to which have been added "low heat" NFDM.

Vegetable hydrocolloids such as guar gum were investigated for their effects on this negative organoleptic phenomenon of dryness as well as on the keeping time of breads made from flour combinations with "low heat" NFDM, but first their effects on loaf characteristics were evaluated. Using the straight dough method of Example I, loaves were prepared by the addition of salt, sugar, yeast and water to various mixes composed of 250 g wheat flour (17% and 24% gluten content), "low heat" NFDM (9.0% and 33% based on flour weight (22.5 g and 82.5 g)) and guar gum (0.8% to 1% based on flour weight (2 g to 2.5 g)). The doughs, scaled at 63 g, were proofed for up to one hour, baked at 204° C. for 12 minutes and cooled. The resulting loaves were measured to determine their specific volume, using a volume displacement technique. The results are presented in Table IV.

TABLE IV

| GLUTEN CONTENT OF FLOUR (%) | "LOW HEAT" NFDM % FLOUR WEIGHT | GUAR GUM % FLOUR WT. | SPECIFIC VOLUME (STD. DEV.) |
| --- | --- | --- | --- |
| 17 | 9.0 | 0 | 5.4 (.13) |
| 17 | 9.0 | 0.8 | *6.1 (.21) |
| 24 | 33.0 | 0 | 5.2 (.21) |
| 24 | 33.0 | 1.0 | 5.4 (.24) |

*Sample With Guar Has A Significantly Greater Volume Compared To Sample Without Guar, $p < .01$ The addition of guar gum in the amount of 0.8%, based on flour weight, produced a significant increase in specific volume at the 17% level of wheat flour protein and "low heat" NFDM studied.

EXAMPLE V

EFFECT OF VEGETABLE GUMS ON BREADS CONTAINING "LOW HEAT" NFDM, COMPARED TO "HIGH HEAT" NFDM

The above increase in specific volume resulting from the addition of vegetable gums is an unexpected effect of the combination of "low heat" NFDM and vegetable gum on loaf volume, confirmed by the following experiment:

Using the straight dough method of Example I, loaves were prepared by the addition of salt, sugar, yeast and water to various mixes composed of 250 g wheat flour (17% gluten) "low heat" NFDM (6% based on flour weight (9 g)) or "high heat" NFDM (6% based on flour weight (9 g)) and guar gum (0.8% per 100 parts of flour (2 g)), as shown in Table V. The doughs were scaled at g, proofed up to one hour, baked at 204° C. for minutes and cooled. The resulting loaves were measured to determine their specific volumes using a volume displacement technique. The results are given in Table V, in which all weights are listed per 100 parts of flour. The enhancement of the "low heat" NFDM and vegetable gum combination on loaf volume can be seen.

TABLE V

| GUAR GUM % FLOUR WT. | "LOW HEAT" NFDM % FLOUR WT. | "HIGH HEAT" NFDM % FLOUR WT. | SPECIFIC VOLUME (STD. DEV.) |
| --- | --- | --- | --- |
| 0 | 0 | 0 | 5.0 (.24) |
| 0.8 | 0 | 0 | 5.1 (.16) |
| 0 | 0 | 6 | 4.6 (.40) |
| 0.8 | 0 | 6 | 4.8 (.25) |
| 0 | 0 | 0 | 5.0 (.22) |
| 0.8 | 0 | 0 | *5.8 (.31) |

*Specific Volume Greater Than Any Other Group $p < .01$

Increasing the level of guar gum to 1.7% based on flour weight gave no further increase or no decrease in the specific volume. This level of gum addition is the maximum which was able to be used before people eating the bread product experienced a slight after-eating residue of gum on the lips and mucus membranes of the mouth.

The addition of vegetable hydrocolloids and in particular, guar gum, produces benefits on bread quality other than those on specific volume described above. When added to high gluten content flours, these vegetable hydrocolloids remove the drying sensation in the mouth experienced while eating these products. Most importantly, the combination of "low heat" NFDM and guar gum can increase the "keeping time" of breads made from flours to which it has been added. "Keeping time" in this case is not judged solely on compressibility which by itself may be a poor guide to the edibility of the product under study. A better index is edibility itself which integrates all sensory inputs including tactile, visual, olfactory and oral feel and taste.

EXAMPLE VI

ADDITION OF "HIGH HEAT" NFDM TO BREADS CONTAINING "LOW HEAT" NFDM

It would be desirable from the nutritional standpoint to increase the amount of NFDM in bread beyond the levels determined by the maximal specific volume as depicted in Table II and FIG. 1. This is particularly beneficial with those flours having a wheat protein content greater than 17%, where the combination of wheat proteins, which are deficient in the amino acid, L-lysine, with milk proteins in approximately equivalent amounts creates an amino acid balance meeting nutritional standards for complete proteins. In addition, because of the quantity of protein, the resultant bread product would serve as an excellent protein source.

Using the straight-dough method of Example I, loaves were prepared by the addition of salt, sugar, yeast and water to the mixes shown in Table VII, composed of 250 g of wheat flour with a protein content of either 17% or 21% combined with "low heat" NFDM and/or "high heat" NFDM in amounts of about 42% by weight based on the flour weight (105 g), and in some instances guar gum, 0.9% to 1.1% based on the flour weight (2.3 g to 2.8 g). The doughs were scaled at 63 g, proofed for one hour, baked at 204° C. for 12 minutes and cooled. The resulting loaves were measured to determine their specific volumes using a displacement technique. The results are presented in Table VI.

TABLE VI

| ITEM | GLUTEN CONTENT % | "LOW HEAT" NFDM % FLOUR WT. | "HIGH HEAT" NFDM % FLOUR WT. | GUAR GUM % FLOUR WT. | SPECIFIC VOLUME (STD. DEV.) |
| --- | --- | --- | --- | --- | --- |
| a | 17 | 0 | 0 | 0 | 5.0 (.24) |
| b | 17 | 4.3 | 0 | 0 | 4.9 (.32) |
| c | 17 | 0 | 43.0 | 0 | *+3.4 (.24) |
| d | 17 | 43.0 | 0 | 0 | *+3.4 (.08) |
| e | 17 | 21.5 | 21.5 | 0 | *+3.3 (.20) |
| f | 17 | 10.6 | 31.9 | 0 | *+3.3 (.20) |
| g | 17 | 4.3 | 38.2 | 0 | *3.8 (.06) |
| h | 17 | 2.2 | 40.3 | 0 | *+3.5 (.26) |
| i | 17 | 4.3 | 38.2 | 0.9 | **4.7 (.23) |
| j | 21 | 14.0 | 0 | 0 | 4.7 (.32) |
| k | 21 | 0 | 42.0 | 0 | 3.7 (.12) |
| l | 21 | 14.0 | 28.0 | 0 | ***5.0 (.19) |
| m | 21 | 14.0 | 28.0 | 1.1 | ***5.2 (.14) |

*Specific Volume < Control (Item a) p < .01
+Specific Volume < Item g p < .01
**Specific Volume Item a And Item i No Significant Difference
***Specific Volume > Item k p < .01

Table VI depicts that a combination of "low heat" NFDM in amounts less than those required to produce the maximal specific volume at a given gluten level of flour combined with "high heat" NFDM in amounts from 2 to 9 times the amount of "low heat" NFDM, and higher, produces a bread with a specific volume greater than obtained by using the combined total amount of NFDM supplied either by "high heat" NFDM or "low heat" NFDM solely. When vegetable gum was added to these combinations of "low heat" NFDM and "high heat" NFDM, a further increase in specific volume was obtained. In the case of the 17% gluten level, the samples made with a combination of "low heat" NFDM and "high heat" NFDM in a 1:9 ratio respectively and guar gum (Item i) showed no significant difference statistically in their specific volumes compared to those of the control group (Item a). However, the baked samples of Item i, containing both "low heat" NFDM and "high heat" NFDM and guar gum, were far superior to those with no additions, Item a (control), from the standpoint of physical appearance and organoleptic acceptability

EXAMPLE VII

ADDITION OF "HIGH HEAT" NFDM TO BREADS CONTAINING "LOW HEAT" NFDM, RESULTS AT THE PRODUCTION LEVEL a. Results similar to those reported in the laboratory study (Example VI) were obtained in a bakery operation using commercial scale equipment. The production runs were made employing a "straight dough" method. A 17% gluten content wheat flour was made by mixing wheat flour (12.5% gluten) and vital gluten (80% gluten). The "low heat" NFDM was used at a level of 4.2% based on flour weight and the "high heat" NFDM at a level of 38.4% based on flour weight; the combined amount of NFDM was at the level of 42.6%. Guar gum was used at a level of 1% based on flour weight.

The following dry ingredients were added to a "Peerless" horizontal mixer (180 kg. capacity) and blended:

| | |
| --- | --- |
| wheat flour (12.5% gluten) | 35.0 kg |
| vital gluten (80% gluten) | 2.7 kg |
| "low heat" NFDM | 1.6 kg |
| "high heat" NFDM | 14.5 kg |
| guar gum | 0.4 kg |
| sugar | 1.4 kg |
| salt | 0.7 kg |

After blending, the following ingredients were added:

| | |
| --- | --- |
| shortening | 1.4 kg |
| yeast | 2.3 kg |
| water | 27.3 kg sufficient to make dough |

All ingredients were mixed at low speed (40 rpm, 10 hp) for two minutes and at high speed (80 rpm, 20 hp) for five minutes. A soft, elastic dough mass was formed which was easily removed from the mixer, leaving it clean. The resultant dough was fed into an automatic divider and rounder to produce dinner rolls (63–65 g scale). The dough ran clean without hang-up. The pieces were panned and proofed for one hour at 37° C. and 98% humidity. There was an excellent rise with the pieces filling the pans. The rise held during floor time. The rolls were baked at 190° C. for about 14 minutes, a normal baking time. The oven temperature was lower than normally used to prevent excessive browning because of the high lactose content of the dough. There was "oven spring" and the rolls had a full, regular appearance with a golden brown color and excellent aroma. The rolls were cooled in an open room, divided and packaged, one dozen (6×6) in polyethylene tie bags. The rolls had excellent flavor and eating characteristics. Samples were randomly selected for measurement of specific volume. The following results were obtained:

specific volume—4.6
standard deviation—0.20

The specific volumes of the laboratory sample (Example VI) and the production sample did not exhibit a significant statistical difference.

b. In addition to its effect on loaf specific volume, dough relaxation even at high gluten levels with the associated ease of dough handling is a major feature of the effect of "low heat" NFDM. In order to illustrate this at the production level, a run was made using the procedures and equipment described in the above Example VII a, with the difference that the ingredients were changed as follows:

| | |
|---|---|
| wheat flour | 45.5 kg |
| vital gluten | 3.2 kg |
| "high heat" NFDM | 17.5 kg |
| "low heat" NFDM | 1.8 kg |
| guar gum | 0.5 kg |
| sugar | 1.4 kg |
| salt | 0.7 kg |
| yeast | 1.4 kg |
| shortening | 0 - eliminated |
| water | 35.0 kg |

This resulted in a wheat flour having a 17% gluten content with a NFDM content of 39.6% based on flour weight. The NFDM consisted of 3.7% as "low heat" NFDM based on flour weight and the remainder (35.9% based on flour weight) as "high heat" NFDM.

The dough was divided and rounded into 340 g pieces which were immediately fed into a conveyor and then passed through a system of rollers to produce pizza rounds, 36 cm in diameter. The dough balls ran smoothly without hang-up. The rounded flats did not retract after being formed. This was in contrast to the experience with a standard dough made using a wheat flour having approximately 13% gluten content which had to be relaxed for 30 minutes prior to forming by passage between the rollers in order to reduce the amount of shrinkage or retraction after converting the dough pieces into flattened pizza shell rounds.

Baked pizza crusts made from the above-described "low heat" NFDM and "high heat" NFDM dough had a chew and texture comparable to the standard pizza crust made with the 13% gluten flour but the former NFDM product was superior in flavor.

EXAMPLE VIII

EFFECT OF "LOW HEAT" NFDM ON OTHER FLOURS CONTAINING WHEAT PROTEIN

It was of interest to determine if the relationship between wheat protein and the milk proteins of "low heat" NFDM would be sustained with the use of grain flours other than wheat when combined with a wheat protein such as vital gluten. Using the straight-dough method of Example I, sugar, salt, yeast and water were added to the mixes depicted in Table VII of 250 g of flours of 26% and 31.5% vital gluten contents, made from the combination of gluten flour (80% vital gluten content) and milled oat bran, with "low heat" NFDM in amounts of 10% to 100% by weight, based on 100 parts of flour (25 g to 250 g). The doughs were scaled at 63 g, proofed for one hour, baked at 204° C. for 12 minutes and cooled. The resulting loaves were measured to determine their specific volumes using a displacement technique. The results are presented in Table VII.

It can be seen that the maximal specific volume obtained with a "low heat" NFDM addition of 60%, based on flour weight, to the flour of 26.2% gluten content falls precisely on the established curve of FIG. 1. The addition of up to 100% addition of "low heat" NFDM, based on flour weight to flours of 31.5% gluten content does not provide data to show the attainment of a maximal specific volume. As would be predicted from extrapolation of the curve of FIG. 1, the addition would have to approach the 200% level to reach the maximum. However, as noted above, milk solid levels above 100% based upon flour weight are undesirable because of their effect on dough characteristics, producing a tough, inelastic non-extensible dough.

TABLE VII

| GLUTEN CONTENT % | "LOW HEAT" NFDM (% FLOUR WEIGHT) | (STD. DEV.) SPECIFIC VOLUME |
|---|---|---|
| 26 | 0 | 4.1 (.15) |
| 26 | 10.0 | 2.6 (.16) |
| 26 | 40.0 | 3.1 (.31) |
| 26 | 60.0 | 3.6 (.10) |
| 26 | 80.0 | 2.8 (.27) |
| 31.5 | 0 | 4.1 (.27) |
| 31.5 | 80.0 | 3.8 (.22) |
| 31.5 | 100.0 | 3.9 (.22) |

EXAMPLE IX

COMPARISON OF "LOW HEAT" NFDM AND UNDENATURED WHEY PROTEIN CONCENTRATE

The purpose of this example is to demonstrate that the choice of milk protein source, such as "low heat" NFDM or whey protein concentrate is more than a matter of choice. The preservation of the whey proteins, lactalbumen and lactglobulin, in an undenatured state is a major feature of "low heat" NFDM as compared to "high heat" NFDM. This is illustrated by how they are defined by the Department of Agriculture. Specifically, 7 C.F.R. §58.2540 defines "high heat" NFDM as having an undenatured whey protein nitrogen level not exceeding 1.5 mg/g. "Low heat" NFDM is defined as having not less than 6.0 mg undenatured whey protein nitrogen per gram.

This experiment demonstrates that "low heat" NFDM provides a bread product of unexpectedly superior volume when compared to one made with an undenatured whey concentrate containing 34% by weight of whey proteins (WAPRO-34 provided by Kraft).

The optimal level of the undenatured whey concentrate, as defined as that amount producing a baked product of maximal specific volume, was determined for a wheat flour having a gluten content of 17.1% using the methodology described in Example I. The results are given in Table VIII.

TABLE VIII

VOL. (CC)
LOAF SPECIFIC VOLUME (WG(8)) 17.1% GLUTEN

|  | UNDENATURED WHEY CONCENTRATE (% FLOUR WEIGHT) | | | |
| --- | --- | --- | --- | --- |
|  | 0 | 0.12 | 0.30 | 0.80 |
| SP. VOL. (ST. DEV.) | 5.0 (.24) | <u>3.8</u> (.26)*+ | 3.5 (.18)* | 3.2 (.12)* |

Underlined Value - Indicates Optimal Value - As Defined Above
*Value Less Than control $p < .01$
+3.8 > 3.2 $p < .01$ The doughs treated with all levels of undenatured whey concentrate were soft, extensible, easy to handle and form. The doughs did not hold during "floor time." The handling characteristics were similar to those experienced using "low heat" NFDM with the exception that products made with "low heat" NFDM maintained their shape and volume when being held for "floor time."

Comparing these results using undenatured whey concentrate with those obtained with "low heat" NFDM, described in Table I, it can be seen that the specific volumes of the baked pieces obtained using these two milk products differ significantly. The results are given in Table IX.

TABLE IX

LOAF SPECIFIC VOLUME COMPARISONS
- USING "OPTIMAL AMOUNTS" OF
"LOW HEAT" NFDM OR UNDENATURED WHEY CONCENTRATE AND A 17.1% GLUTEN CONTENT FLOUR -

|  | CONTROL | "LOW HEAT" NFDM | UNDENATURED WHEY CONCENTRATE |
| --- | --- | --- | --- |
| % FLOUR WT. | 0 | 9.0 | 0.12 |
| SP. VOL. (STD. DEV.) | 5.0 (.24) | 5.4 (.13)+* | 3.8 (.26)** |

+S.V. Low Heat > Whey $p < .01$
*S.V. Low Heat > Control $p < .01$
**S.V. Whey < Control $p < .01$ Based upon the definition of "low heat" NFDM as provided by the Department of Agriculture, 7 C.F.R. §58.2540 (see above), the amount of whey protein in the optimal value of "low heat" NFDM in Table X is greater than 342 mg, using the nitrogen conversion factor of 6.38 for whey protein this amount is approximately eight times that supplied by the "optimal amount" of undenatured whey concentrate and is closer to the 0.80 value (Table VIII) which has a specific volume significantly less than that found using the optimal amount of 0.12% flour weight.

In view of the foregoing, the observed effects of "low heat" NFDM cannot be explained solely on the basis of its undenatured whey content.

Whey protein concentrates have been used to enhance the protein content and value of bread products. These have not been undenatured whey products and fail to provide the characteristics to doughs made from grain flours imparted by undenatured whey and "low heat" NFDM.

U.S. Pat. No. 3,561,974 (the '974 patent) discloses bread products in which the weight of the whey protein is more than 50% of the weight of the flour. This patent discloses a protein bread based on a combination of wheat flour containing 22% to 24% protein and wheat flour containing 12% to 13% protein to which a whey protein concentrate is added as a protein supplement. The '974 patent states that this whey protein concentrate is for use by bakers and contains about 84% protein. This example will demonstrate that the whey protein concentrate consists of proteins that have been denatured by processing.

Bread compositions were prepared according to the formulations listed in Table X. The undenatured whey protein was made available from Kraft Foods under the trade name WAPRO-34. This product is a whey protein concentrate as was that described in the '974 patent, except that it is established that the WAPRO proteins have not been heat-treated and denatured, and that the protein content is 34% rather than 84%.

TABLE X

| Ingredient | Sample 1 | Sample 2 |
| --- | --- | --- |
| Flour (31.4% gluten) | 250 g | 250 g |
| Undenatured Whey Concentrate (34% protein) | 97 g | 32 g |
| Water | 250 cc | 220 cc |
| Sugar | 9 g | 9 g |
| Salt | 2 g | 2 g |
| Yeast | 15 g | 15 g |

The Sample 1 ingredients were mixed for one hour at low speed (40 rpm) in a Hobart mixer using a dough hook, followed by an additional one hour of mixing at about twice that speed. Despite this extensive mixing, they failed to form a dough and remained batter—like in consistency indicating an inhibition of gluten protein cross-linking. The whey protein in the Sample 1 formulation was 13% of the flour weight which is approximately 25% of the whey protein addition in the '974 patent.

The Sample 2 composition with less than 4% by flour weight whey protein came together following three minutes of low speed mixing and formed a dough ball after an additional three minutes of high speed mixing. The dough was extensible, and could be worked easily into 63 g bread pieces. The pieces were proofed for one hour and baked at 204° C. for 15 minutes. The resultant product had a bread-like consistency and flavor. It was not rubbery or chewy, reflecting more of the characteristics which would be associated with this level of vital gluten.

In contrast, the '974 patent states that the milk protein concentrate and flour mixture forms a glutinous, rubbery cohesive mass. This is despite the fact that the '974 patent uses more milk protein product than was used in either Sample 1 or Sample 2 with more than four times the level of whey proteins as Sample 1 and twelve times the level used in Sample 2. Further, it should be noted that the gluten content of the wheat flours of the '974 patent calculates to be about 20%, whereas the gluten contents of Sample 1 and Sample 2 were greater than 31%. These results show significant differences between the behavior of the whey proteins described in the '974 patent and those supplied in the WAPRO product used to make Sample 1 and Sample 2. Since the whey proteins of the WAPRO product are undenatured, it would indicate the whey proteins of the '974 patent have been denatured probably by the heat of the drying process. The '974 patent therefore fails to disclose bread compositions containing undenatured whey proteins or a material such as "low heat" NFDM, both of which impart similar characteristics to the processing of doughs made from grain flours making them extensible, soft and easy to work and form.

Additionally, it can be seen that "low heat" NFDM behaves with completely different characteristics than does the whey protein concentrate of the '974 patent. These differences include the following:

1. Water Requirements
   a. "Low heat" NFDM—about 50% of (the flour weight, plus the NFDM weight) is required to make a dough.
   b. Whey concentrate '974 patent—about 100% of (the flour weight plus the whey concentrate weight) is required to make a dough.
2. Baking Time
   a. Doughs containing "low heat" NFDM in the preferred amounts bake in the same time as doughs made from standard flours. Baking temperature is about 25% lower because of the increased "browning reaction."
   b. Baking time of doughs of the '974 patent are excessive in order to "bake out" the large amount of water needed to make a dough.
3. Dough Characteristics
   a. "Low heat" NFDM doughs compare to doughs made from high quality flour. They are extensible, easily worked, non-sticky, stable (resists shrinkage during "floor time") and have "oven spring."
   b. Whey concentrate '974 patent doughs do not have any of the positive features of the "low heat" NFDM doughs described in "3a."
4. Method of Processing
   a. "Low Heat" NFDM dough can be processed by either a "straight dough" or sponge-dough method.
   b. Whey concentrate '974 patent requires a sponge-dough method, a less-stringent method for attaining a workable high performance dough.

greater than loaf volumes obtained with equivalent quantities of "high heat" NFDM for the given gluten content flours. The loaf volumes are also greater than that of control samples made without NFDM.

To demonstrate that a component of "low heat" NFDM is not present in "high heat" NFDM, bread loaves were prepared, with a first set containing optimal levels of "low heat" NFDM and a second set substituting "high heat" NFDM for the optimal levels of "low heat" NFDM. A control set was also prepared, in which the bread loaves contained no NFDM. The bread loaves were prepared as in Example I. The results are depicted below in Table XI. Standard deviations are expressed parenthetically.

TABLE XI

| Gluten Content % | Control (No NFDM) | Low Heat NFDM (% Flour Weight) | | | (% Flour Weight) | |
|---|---|---|---|---|---|---|
| 17.1% | 0%<br>5.0 (.24) | 6.0%<br>5.0 (.22) | 9.0% +<br>5.4 (.13) | 12.0%<br>5.2 (.5) | 6.0% ++<br>4.5 (.25) | 9.0% ++<br>4.0 (.25) |
| 24.3% | — | 36.0% *<br>4.7 (.40) | 40.0% *<br>5.6 (.23) | 62.5% **<br>4.2 (.21) | 36.0%<br>3.7 (.19) | 62.5%<br>3.8 (.48) |
| 27.8% | — | 87.5% ***<br>5.2 (.48) | | | 87.5%<br>1.8 (.06) | |

+ Specific Volume Low Heat > Control p < .01
++ Specific Volume Low Heat < Control p < .01
* Specific Volume Low Heat > High Heat 36% p < .01
** Specific Volume Low Heat > High Heat 62.5% p < .01
*** Specific Volume Low Heat > High Heat 87.5% p < .01

EXAMPLE X

COMPARISON OF "HIGH HEAT" NFDM AND "LOW HEAT" NFDM

Table II illustrates that above a gluten content of about 17%, the optimal level of "low heat" NFDM becomes significantly greater than NFDM levels disclosed by the prior art, such as the 4% NFDM level taught by U.S. Pat. No. 3,271,164 and the 2% to 6% NFDM level taught by U.S. Pat. No. 3,411,919. As will be demonstrated below, not only does the present invention utilize "low heat" NFDM at levels significantly greater than considered acceptable by the conventional wisdom of the prior art, the "low heat" NFDM produces bread products with loaf volumes significantly Levels of "high heat" NFDM comparable to the optimal "low heat" NFDM levels for any given gluten content flour produce bread loaves of significantly lower specific volumes.

Notably, "high heat" NFDM not only produces bread products with loaf volumes significantly lower than loaf volumes obtained with equivalent quantities of "low heat" NFDM for the given gluten content flours; the loaf volumes are lower than that of control samples made without NFDM for the 17% gluten flours. In contrast, "low heat" NFDM bread products had greater loaf volumes than the control samples for the 17% gluten content flour.

In view of the foregoing, the observed effects of "low heat" NFDM cannot be explained solely on the basis of its undenatured whey content. The effect of "low heat" NFDM is more than the weakening of gluten cross-linking attributable to undenatured whey protein. Unlike "high heat" NFDM and the WAPRO undenatured whey product, "low heat" NFDM augments bread volume to amounts greater than control levels. Therefore, there has to be a factor of gluten strengthening subsequent to gluten weakening not provided by undenatured whey protein (WAPRO) alone, or by undenatured (high heat) NFDM. That is, "low heat" NFDM contains something other than whey protein that is also not present in "high heat" NFDM. Whatever is present in "low heat" NFDM is apparently denatured or otherwise physically changed during the "high heat" process. It is this material that is acting to provide improved bread structure and loaf volume to bread products prepared from "low heat" NFDM.

The present invention thus makes it possible to prepare a bread product at a protein level of 20% to 24%. This is equivalent to the protein level of meat, without the cholesterol or fat. This protein content is also provided at one-fifth the cost of meat. The present invention is thus a useful means to feed protein-deprived nations. The compositions of the present invention are easy to transport and reconstitute and are high-heat pasteurized by baking. The compositions are also useful in the preparation of meal replacement in weight control programs and for individuals with appetite problems such as the aged and those undergoing chemotherapy.

The foregoing experiments demonstrate that the improved bread structure and loaf volume obtained from the use of "low heat" NFDM in bread products is completely unexpected from the prior art. The bread product compositions of the present invention containing "low heat" NFDM at the levels described differ significantly from the bread product compositions disclosed by the prior art by virtue of the bread structure and loaf volume obtained.

As will be readily appreciated, numerous variations and combinations of the features set forth above can be utilized without departing from the present invention as set forth in the claims. Such variations are not regarded as a departure from the spirit and scope of the invention, and all such modifications are intended to be included within the scope of the following claims.

What is claimed is:

1. A composition for preparing a bread product comprising:
   a grain flour having a wheat protein content between about 17% and about 30% by weight; and
   "low heat" non-fat dry milk solids present in an amount between about 9% and about 100% based on flour weight that is effective to provide a bread product having an additive-free specific volume greater than about 4.0 cc/g.

2. The composition of claim 1, wherein said grain flours are selected from the group consisting of wheat flour, whole wheat flour, wheat bran, rye flour, Miller's bran flour, corn flour, milled oat bran, milled rolled oats, millet flour, rice flour, oat flour, barley flour, triticale flour, soy flour, buckwheat flour and mixtures thereof.

3. The composition of claim 2, wherein said grain flour comprises wheat flour.

4. The composition of claim 1, wherein said grain flour comprises vital gluten.

5. The composition of claim 1, wherein said additive-free specific volume is greater than about 5.0 cc/g.

6. The composition of claim 1, wherein said grain flour has a wheat protein content up to about 28% by weight.

7. The composition of claim 6, wherein said "low heat" NFDM is present in an amount up to about 88% based on flour weight.

8. The composition of claim 7, wherein said grain flour has a wheat protein content up to about 24% by weight and said "low heat" NFDM is present in an amount up to about 40% based on flour weight.

9. The composition of claim 1, further including "high heat" NFDM solids, wherein the combined percentage by weight of milk solids of said composition is less than 100% based on flour weight.

10. The composition of claim 9, wherein said "high heat" NFDM is present in an amount effective to provide a bread product, a 50 g to 100 g serving of which contains calcium and protein in an amount equivalent to about a 120 mL to about a 240 mL portion of whole milk.

11. The composition of claim 9, wherein said grain flour has a protein content up to about 26% by weight, said "low heat" NFDM is present in an amount up to about 50% based on flour weight, and said "high heat" NFDM is present in an amount between about 20% and about 65% based on flour weight.

12. The composition of claim 1, further comprising a vegetable gum selected from the group consisting of guar gum, carrageenan, algins, karaya gum and mixtures thereof.

13. The composition of claim 12, wherein said vegetable gum is present in an amount between about 0.12% and about 1.70% based on flour weight.

14. A dough comprising water, a leavening agent and the composition of claim 1.

15. A dough as made in claim 14, wherein said leavening agent is yeast.

16. A baked product made from the leavened dough of claim 14.

17. A dough comprising water, a leavening agent and the composition of claim 9.

18. A dough as made in claim 17, wherein said leavening agent is yeast.

19. A baked product made from the leavened dough of claim 17.

20. A dough comprising water, a leavening agent and the composition of claim 12.

21. A dough as made in claim 20, wherein said leavening agent is yeast.

22. A baked product made from the leavened dough of claim 20.

23. A composition for preparing a bread product comprising:
   a grain flour having a wheat protein content of about 17% by weight;
   "low heat" non-fat dry milk solids present in an amount between about 3% and about 5% based on flour weight; and
   "high heat" non-fat dry milk solids present in an amount up to about 50% based on flour weight that is effective to provide a bread product having an additive-free specific volume greater than about 4.0 cc/g.

24. A dough comprising water, a leavening agent and the composition of claim 23.

25. A dough as made in claim 24, wherein said leavening agent is yeast.

* * * * *

UNITED STATES PATENT AND TRADEMARK OFFICE
CERTIFICATE OF CORRECTION

PATENT NO. : 5,458,902
DATED : October 17, 1995
INVENTOR(S) : Rudel

It is certified that error appears in the above-identified patent and that said Letters Patent is hereby corrected as shown below:

Column 16, line 17, "scaled at g" should read --scaled at 63 g--.

Column 16, line 18, "204°C. for minutes" should read --204°C for 12 minutes--.

Columns 23-24, within Table XI, the last column heading "(% Flour Weight)" should read:

-- High Heat NFDM --
       (% Flour Weight)

Signed and Sealed this

Twenty-third Day of April, 1996

*Attest:*

BRUCE LEHMAN

*Attesting Officer*     *Commissioner of Patents and Trademarks*